United States Patent [19]

Fey

[11] Patent Number: 4,954,759
[45] Date of Patent: Sep. 4, 1990

[54] CONTROL CIRCUIT FOR AN ELECTROMAGNETIC BREAKING ARRANGEMENT

[75] Inventor: Rainer Fey, Schweinfurt, Fed. Rep. of Germany

[73] Assignee: Fichtel & Sachs AG

[21] Appl. No.: 168,678

[22] Filed: Mar. 16, 1988

[30] Foreign Application Priority Data

Apr. 1, 1987 [DE] Fed. Rep. of Germany ....... 3710842

[51] Int. Cl.$^5$ .............................................. H02P 3/00
[52] U.S. Cl. .................................... 318/375; 318/362; 318/367; 318/376; 318/757; 318/759; 318/760; 188/159
[58] Field of Search ............... 188/156, 157, 158, 161, 188/163, 164; 310/77, 93, 106; 318/63, 86, 87, 757, 759, 362, 367, 760, 761, 765, 371, 375, 376

[56] References Cited

U.S. PATENT DOCUMENTS 3,699,416 10/1972 Sloan et al. ......................... 318/761
4,084,810 4/1978 Forsman .

FOREIGN PATENT DOCUMENTS 0058718 6/1986 European Pat. Off. .

Primary Examiner—William M. Shoop, Jr.
Assistant Examiner—Gary J. Romano
Attorney, Agent, or Firm—Toren, McGeady & Associates

[57] ABSTRACT

The electromagnetic braking arrangement comprises an exciting winding which is supplied from a generator winding which on the one hand excites the generator winding and on the other hand induces a braking torque in a short-circuited winding moved with the generator winding. The excitation current of the exciting winding is controlled by a transistor of a current-regulating circuit which holds the excitation current and thus the braking torque at a level adjustable at a reference voltage source. The iron circuit of the exciting winding has residual magnetic properties which ensure an initial self-excitation. The components of the control circuit are supplied with operating voltage from the generator winding via a rectifier circuit. A resistor, which is directly connected to the rectifier circuit, controls the transistor in the conductive state even when the operating voltage is insufficient for proper operation of the control circuit. It is thereby achieved that the braking arrangement is able to operate even with comparatively low magnetic circulation.

15 Claims, 1 Drawing Sheet

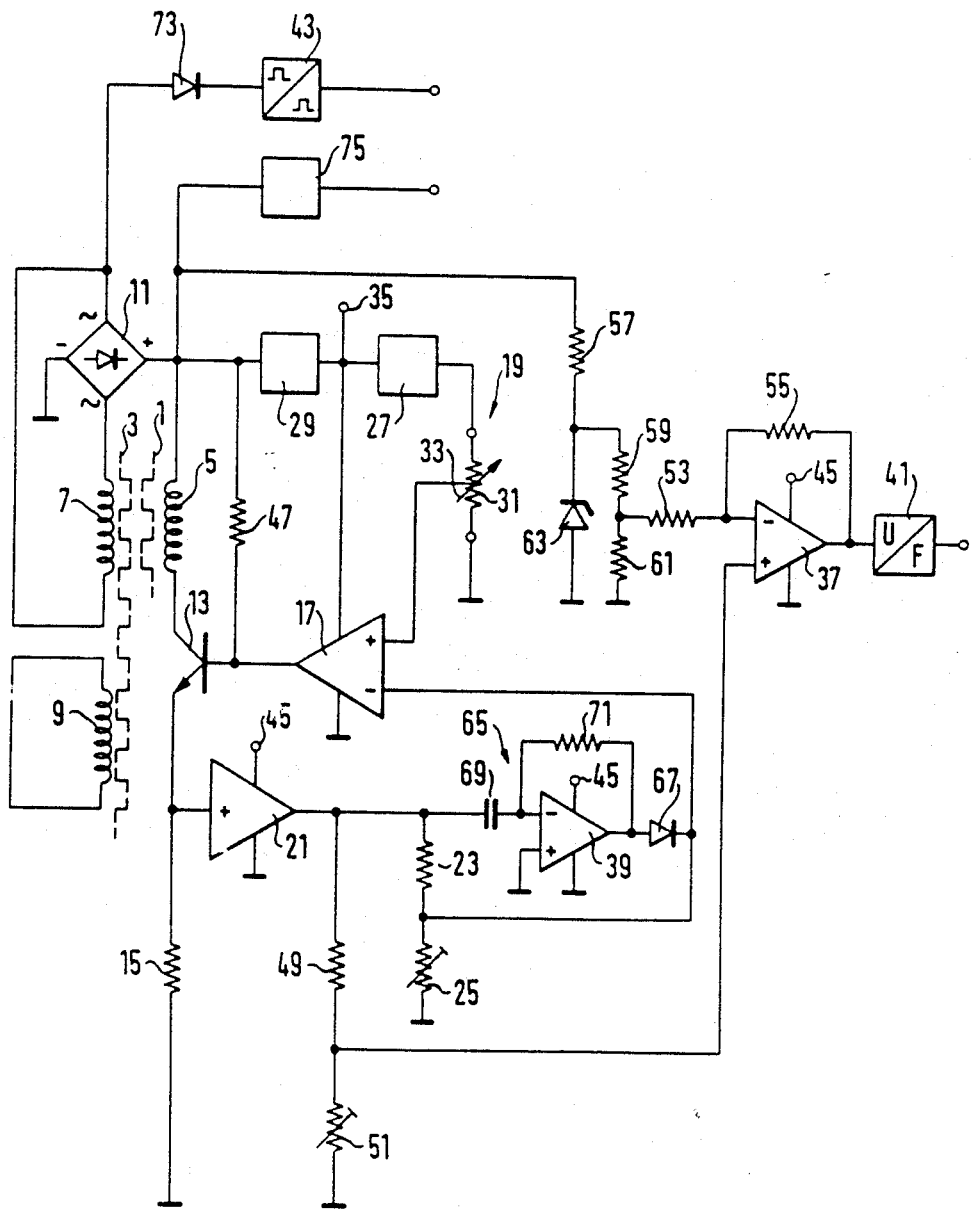

CONTROL CIRCUIT FOR AN ELECTROMAGNETIC BREAKING ARRANGEMENT

BACKGROUND OF THE INVENTION

The invention relates to an electromagnetic braking arrangement, in particular for an ergometer.

European Pat. No. 0 058 718 discloses an ergometer which comprises an electric generator driven via an epicyclic gear. The generator has an exciting winding excited by external power sources and a three-phase generator winding to which external load resistances are connected. The excitation current of the exciting winding can be controlled so as to adjust the braking moment. Its possible applications are restricted by the fact that external power sources have to be available for the excitation of the generator.

U.S. Pat. No. 4 084 810 discloses an ergometer whose stator is excited by a rotating field. The rotating field generates a braking moment in an eddy current rotor, even if the rotor is driven at a comparatively slow speed of rotation. However, an external power source is also required for the operation of this known ergometer.

The U.S. patent application No. 912 592 filed on Sept. 26, 1986 (corresponding to German patent application No. P 36 31 672.5) proposes an electromagnetic braking arrangement for an ergometer, which comprises a stator and a rotor movable relative to the stator. The stator and rotor form multipole soft-iron circuits which are closed to form a magnetic circuit. One of the iron circuits has an exciting winding, whereas the other iron circuit has a generator winding and a short-circuited winding. Current from the generator winding is fed to the exciting winding and induces in the short-circuited winding currents whose magnetic field retards the relative rotation of stator and rotor. The braking moment is maintained at a predetermined desired value by a control circuit which controls the excitation current supplied by the generator winding. The control circuit is also supplied with operating voltage from the generator winding. An electromagnetic braking arrangement of this type constitutes a very compact unit and can operate without external power sources and load resistances.

In the braking arrrangement proposed in the U.S. patent application No. 912 592 the generator winding is initially excited itself by residual magnetic properties of the softiron circuit associated with the exciting winding.

The invention is directed towards provision of a control circuit for an electromagnetic braking arrangement of the type proposed in the U.S. patent application No. 912 592, which does not require external power sources for the operation of its components and can adjust the braking moment even with a very slight rate of change in the magnetic flux.

SUMMARY OF THE INVENTION

Within the scope of the invention, the transistor connected in series with the exciting winding and controlling the excitation current is not only controlled by an amplifier as a function of the desired value-actual value comparison but is also connected to the generator winding via a coupling circuit. The coupling circuit is so designed that it endeavors to control the transistor in its fully biased, i.e. conductive, condition. The control circuit supplied with operating voltage from the generator winding overrides the coupling circuit when the voltage of the generator winding is sufficient for the operation of the control circuit and, in particular, its amplifier. The coupling circuit fully modulates the transistor at a generator winding voltage which is lower than the rated operating voltage of this amplifier. The expression rated operating voltage is intended to mean here and in the following a voltage which makes possible modulation of the amplifier within the control range provided for the control circuit.

The coupling circuit ensures that the transistor is actuated even at very low voltage of the generator winding resulting from self-excitation induced by residual magnetism and, irrespective of the operating condition of the control circuit, an excitation current flows through the exciting winding which amplifies the magnetic field induced by residual magnetism. The generator voltage thus increases abruptly and delivers sufficient operating voltage for the operation of the control circuit, which thereby adjusts the braking moment to the predetermined desired value.

In this context the coupling circuit is preferably a resistor which directly connects the transistor base to the terminal, on the collector side, of a rectifier circuit connected downstream of the generator winding. It is thereby achieved that the base is already at collector potential even under very low currents and fully biases the transistor.

In a preferred embodiment, to determine the excitation current actual value a current-measuring resistor is connected in series with the exciting winding, at which a voltage proportional to the excitation current is dropped. This voltage forming the actual value is amplified in a voltage amplifier, before it is compared to the desiredvalue voltage supplied from a reference voltage source in the amplifier which controls the transistor and which is in the form of a differential amplifier. In this way it is not only possible to use a comparatively small current-measuring resistance but the reference potential of the reference voltage source can be suitably chosen, for example in such a way that the value of the desired-value voltage is zero when, within the control range, the control circuit sets the torque to zero. This facilitates the controlling of the control circuit by external circuits, for example a microprocessor. If a potentiometer connected to the generator winding via a voltage-stabilizing circuit is used as the reference voltage source, it is thereby ensured that the setting of the desired value is independent of the total resistance of the potentiometer and merely depends on the position of its slider.

Preferably, the voltage amplifier amplifying the current actual signal is connected via an adjustable voltage divider circuit to the differential amplifier controlling the transistor. This measure enables simple null adjustment of the braking arrangement to be carried out.

For many types of application it is desirable to make available, for display or recording purposes, a signal corresponding to the actual value of the braking moment or torque. To obviate additional torque sensors, according to another aspect of the invention, the excitation current of the exciting winding is evaluated as an indication of torque. Certainly, throughout the entire adjustment range of braking moment there is no linear relationship between the excitation current and braking moment. At low excitation currents the braking moment actually achieved is substantially smaller. In order to compensate for this error a differential amplifier is provided which subtracts from a first voltage signal proportional to the excitation current a second voltage signal which varies in magnitude as a function of the excitation current. Within the region of the excitation current-braking moment-correlation to be compensated the second voltage signal is small for low excitation current values and increases with increasing excitation current. Preferably, a limiting circuit is provided which limits the second voltage signal, upon passing into the region of linear correlation, to a predetermined maximum voltage level. In a preferred development, the second voltage signal is derived from a generator voltage, since the generator voltage has the desired variation behavior.

However, because of the residual magnetism of the iron circuits there occurs a certain degree of hysteresis of the torque signal produced as a function of the excitation current. In other words, with increasing excitation current the torque signal represents a different torque value to that with decreasing excitation current. In order to compensate for this undesirable characteristic, a differentiator can be provided which corrects the actual value of the excitation current as function of the rate of change. A diode coupling circuit ensures in this case that the first voltage signal is increased only in the event of a reduction in the excitation current.

For many applications it is desirable to make available a signal which is proportional to the speed of rotation. Since a generator winding produces alternating current, it is possible to provide directly by means of a Schmitt trigger stage an impulse signal which through its pulse repetition rate represents the speed of rotation. Preferably, however, the Schmitt trigger stage is coupled to the generator winding via a half-wave rectifier so as to lower the comparatively high pulse rate brought about by the multipole nature of the iron circuit.

In operation the generator winding supplies more energy than is required to control the braking arrangement. By an additional voltage stabilizing circuit a stabilized d.c. voltage can be provided for external power consumers, for example batteries or light-emitting diode display panels or the like.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The drawing shows, partly in block form, a circuit diagram of an electromagnetic braking device, in particular for an ergometer.

DETAIL DESCRIPTION OF THE DRAWING

The electromagnetic braking device comprises a multipole stator 1 and a multipole rotor 3, to which rotating motion can be imparted about an axis of rotation. The stator 1 is preferably in the form of a claw-pole wheel and forms a soft-iron circuit which consists at least partly of residual-magnetic steel, for example C-35 steel; however, the residual induction should be substantially lower than the saturation induction so as to make possible the control of the excitation current, which will be described in more detail below. The rotor preferably comprises a laminated soft-iron yoke ring which closely surrounds the stator 1 but without contact. The stator 1 has an exciting winding 5 which creates a field alternating in peripheral direction between the claw poles of the claw-pole wheel alternating with one another in peripheral direction. Coils of a generator winding 7 and of a short-circuited winding 9 are accommodated in grooves of the yoke ring of the rotor 3. During relative rotation of the rotor 3 and stator 1 the magnetic field created by the exciting winding 5 induces an alternating voltage in the generator winding 7, which is used to excite the exciting winding 5 in a manner which will be explained below. Furthermore, a short-circuit current is induced in the short-circuited winding 9, the magnet field of which exerts a braking moment on the rotor 3 and which is dependent on the magnitude of the excitation current of the exciting winding 5, in the manner described in detail in the above-mentioned U.S. patent application No. 912 592.

The a.c. voltage generated in the generator winding 7 is rectified in a full-wave rectifier 11. The series connection of the exciting winding 5, the collector-emitter section of a transistor 13 and a current-measuring resistor 15 is connected to the rectifier 11. The collector 13 forms the control element of a current-regulating circuit and controls the excitation current of the exciting winding 5 disposed in its collector circuit. The current-measuring resistor 15, which has a very low resistance value of 0.2 ohms, for example, so as to keep the voltage drop low, is disposed in the emitter circuit of the transistor 13. A differential amplifier 17 is connected to the base of the transistor 13 and at its non-inverting input it receives an adjustable reference voltage which determines the desired value of the excitation current and which originates from a reference voltage source, generally designated 19. A voltage proportional to the actual value of the excitation current is fed to the inverting input of the differential amplifier 17. The actual value voltage is provided by a non-inverting voltage amplifier 21 which amplifies the voltage decreasing at the current-measuring resistor 15 and proportional to the excitation current. A voltage-divider circuit, comprising a fixed resistor 23 and an adjustable resistor 25 is connected to the output of the amplifier and adjustably divides the output voltage of the voltage amplifier 21 and feeds it to the inverting input of the differential amplifier 17. The current-regulating circuit holds the excitation current of the exciting winding 5 constant and with it the braking moment provided by the short-circuited winding 9 at a value set at the reference voltage source 19. The zero point of the braking moment can be balanced at the adjustable resistor 25.

The reference voltage source 19 comprises a voltage stabilizing circuit 27, which is connected via a further voltage stabilizing circuit 29 to the d.c. voltage terminals of the rectifier 11; and a set potentiometer 31 whose slider 33 is connected to the non-inverting input of the differential amplifier 17. Since the differential amplifier 17 compares voltage potentials whose zero point can be balanced, the zero output potential of the reference voltage source 19 is associated with the zero torque value. The maximum output voltage of the voltage stabilizing circuit 27 is associated with the maximum braking moment. The reference voltage source 19 is thus independent of the total resistance value of the potentiometer 31. The advantage of this is that the resistance of supply leads or the like can be left out of consideration and it also has the advantage that desired value voltages can be fed to the non-inverting input of the differential amplifier 17 from other, e.g. external, control sources, for example microprocessors and the like. The voltage stabilizing circuit 27 delivers a constant voltage level which is lower than the constant voltage level of the voltage stabilzing circuit 29 and is matched to the conventional output level of external control circuits of this type.

The voltage stabilizing circuit 29 delivers at its output 35 the operating voltage for differential amplifier 17, for voltage amplifier 21 and also for all the other active components of the braking arrangement which will be described below, in particular a differential amplifier 37, another differential amplifier 39, a voltage-frequency converter 41 and also a Schmitt trigger 43. These components have operating voltage terminals, indicated at 45, which are connected to the output 35 of the voltage stabilizing circuit 29.

In operation, the voltage provided by the generator winding 7 is sufficient for supply to the components, in particular the control circuit, so as to ensure proper operation of the control circuit without additional external power sources. However, difficulties arise in the build-up of the circuit starting from a stationary rotor 3. The no-load voltage of the generator winding 7 is very low because the residual induction of the stator is comparatively low in order to remain as far as possible outside the saturation of the soft-iron core of the stator 1.

To achieve a sufficiently high operating voltage, even with very low magnetic circulation or flux in the circulation circuit formed by the iron circuits of stator 1 and rotor 3, the base of the transistor 13 is connected via a resistor 47 directly to the terminal of the rectifier circuit 11 on the collector side. The resistor 47 is designed that the transistor 13 is fully biased when the output d.c. voltage of the rectifier circuit 11 exceeds the base-emitter reverse voltage which is generally in the order of magnitude of about 0.7 V. The transistor 13 is thus conductive irrespective of whether sufficient operating voltage is fed to the control circuit for it to be fully operational. The output voltage of the generator winding 7 thus provides an excitation current in the exciting winding 5, which in turn results in an increase in the generator voltage. This results in a sudden increase in the generator voltage above the value required for the operation of the control circuit, whereupon after reaching the operating voltage of the control circuit the excitation current of the exciting winding 5 is held constant at the value which is determined by the reference voltage source 19 and which sets the braking torque. In control operation the base current supplied by the resistor 47 and biasing the transistor 13 is compensated for by the output current of the differential amplifier 17.

The braking arrangement comprises an evaluating circuit which supplies a signal proportional to the braking torque. To be able to dispense with an additional torque sensor, the actual value of the excitation current of the exciting winding 5 is evaluated, because a linear correlation exists between the excitation current and the braking torque at least within part of the region. Of course, in a lower current region the effective braking torque is considerably lower than would be expected theoretically. In order to compensate for this deviation, in the region of low current a signal is subtracted in the differential amplifier 37 from the signal representing the excitation current actual value and thus the braking torque, the magnitude of which signal initially increases with increasing excitation current until it remains constant after reaching the current region with linear correlation between excitation current and braking torque.

The non-inverting input of the differential amplifier 37 is connected to a voltage divider circuit which comprises a fixed resistor 49 and an adjustable resistor 51 and which divides the output voltage of the voltage amplifier 21 with an adjustable division factor. The differential amplifier 37 is formed by an input resistor 51 at its inverting input and by a like feedback resistor 55 as amplifier with a voltage amplification equal to 1, and it is connected via the input resistor 53 to a voltage-divider circuit formed by resistors 57, 59, 61. The series connection of the resistors 57, 59, 61 is connected to the d.c. voltage side of the rectifier circuit 11 and supplies at the inverting input of the differential amplifier 37 a voltage which is dependent on the output voltage of the generator winding 7 and which rises with increasing excitation as a result of increasing excitation current of the exciting winding 5. A reverse-bias Zener diode is connected in parallel with the series connection of the resistors 59, 61 which per se again form a voltage-divider circuit. The Zener voltage of the Zener diode 63 is matched to the beginning of the linear region and limits the voltage fed to the inverting input of the differential amplifier 37. The voltage-frequency converter 41 connected to the output of the differential amplifier 37 supplies a pulse signal whose pulse rate is equal to the differential ouput voltage of the differential amplifier 37 and is thus a value for the actual value of the braking torque, which can be directly utilized in digital evaluation circuits.

The residual magnetism of the stator 1 results in a certain degree of hysteresis of the torque signal, which is revealed by the fact that, in relation to the same current actual value, the torque signal merely attains during a reduction in the excitation current a lower value than during an increase in the excitation current. To compensate for this effect, there is connected to the voltage amplifier 21 a differentiator 65 which via a diode 67 superimposes a signal on the voltage proportional to the excitation current at the inverting input of the differential amplifier 17 and in the event of a reduction in the excitation current this signal momentarily superelevates the actual value voltage supplied by the voltage amplifier 21. The superelevation of the actual value voltage causes a momentary reduction in the excitation current actually flowing in the exciting winding 5, thereby ensuring that the excitation current always attains the desired value from the same direction of change, in this case increasing. The differential amplifier 47 and, therefore, the voltage-frequency converter 41 always deliver braking torque signals which represent the braking torque at increasing excitation current. The differentiator 65 is in the form of an active differentiator and comprises the differential amplifier 39 which is used as an inverting amplifier. The inverting input of the amplifier 39 is connected via capacitor 69 to the output of the voltage amplifier 21 and is connected via a feedback resistor 71 to the output of the amplifier 39.

At the output of the Schmitt trigger 41 the circuit provides a pulse signal whose pulse rate is proportional to the speed of rotation of the rotor 3. The Schmitt trigger stage 43 is for this purpose connected via a half-wave rectifier, in this case a simple diode 73, directly to the generator winding 7 supplying an a.c. voltage. The use of a half-wave rectifier makes it possible to lower the comparatively high frequency resulting from the multipole nature of the rotor 3.

Finally, an additional voltage stabilizing circuit 75 is connected to the d.c.voltage side of the rectifier circuit 11, from which the additional, for example external, power consumers, for example auxiliary batteries of external control circuits or external display means, e.g. light-emitting diode display panels or the like, can be supplied.

While specific embodiments of the invention have been shown and described in detail to illustrate the application of the inventive principles, it will be understood that the invention may be embodied otherwise without departing from such principles.

What I claim is:

1. An electromagnetic braking arrangement, in particular for an ergometer, comprising:
   a stator and a rotor movable relative to the stator, the stator and the rotor each having an iron circuit which forms a multipole magnetic flux circuit,
   a generator winding and a short-circuited winding on a first one of said iron circuits,
   an exciting winding on a second one of said iron circuits and supplied from the generator winding, wherein the second iron circuit has residual magnetic properties and induces magnetic alternating fields in the poles of the first iron circuit,
   a control circuit for controlling the current fed to the exciting winding from the generator winding, wherein the control circuit comprises a transistor having a control terminal and two load terminals and an amplifier having operating voltage terminals for supplying a rated operating voltage, said load terminal of the transistor being connected in series with the exciting winding, said control terminal of the transistor being connected to the amplifier and said operating voltage terminals of the amplifier being connected to the generator winding,
   and a coupling circuit coupling the control terminal of the transistor also to the generator winding to keep the transistor fully conductive at a generator winding voltage which is lower than the rated operating voltage of the amplifier.

2. A braking arrangement according to claim 1, wherein the series connection of the exciting winding and the load terminals of the transistor is connected via a rectifier circuit to the generator winding, and the control terminal of the transistor is connected via a resistor directly to the rectifier circuit.

3. A braking arrangement according to claim 1 wherein the amplifier is a differential amplifier whose inverting input is connected via a voltage amplifier to a current-measuring amplifier connected in series with the exciting winding and whose non-inverting input is connected to a reference voltage source.

4. A braking arrangement according to claim 3, wherein the reference voltage source comprises a potentiometer connected via a voltage-stabilizing circuit to the generator winding.

5. A braking arrangement according to claim 3, wherein the inverting input of the differential amplifier is connected to the voltage amplifier via an adjustable voltage divider circuit.

6. A braking arrangement according to claim 1, wherein a current-measuring resistor is connected in series with the exciting winding to provide a first voltage signal corresponding to the excitation current, and wherein to provide a torque signal corresponding to the braking moment of the rotor a differential amplifier is provided which forms the difference between the first voltage signal and a second voltage signal dependent on the voltage of the generator winding.

7. A braking arrangement according to claim 6, wherein a limiting circuit is connected downstream of the generator winding, which limits the voltage level of the second voltage signal, in respect of voltages of the generator winding which are higher than a predetermined value, to a predetermined maximum voltage level.

8. A braking arrangement according to claim 6, wherein there is connected to the current-measuring resistor a differentiator which, in the event of a reduction in the excitation current, increases via a second coupling circuit the first voltage signal as a function of the rate of change of the excitation current.

9. A braking arrangement according to claim 8, wherein the differentiator is coupled via a diode coupling circuit to the inverting input of the differential amplifier of the control circuit controlling the transistor.

10. A braking arrangement according to claim 9, wherein the differentiator is an active differentiator.

11. A braking arrangement according to claim 6, wherein a voltage-frequency converter is connected downstream of the differential amplifier.

12. A braking arrangement according to claim 1, wherein to provide a signal corresponding to the speed of rotation of the rotor a Schmitt trigger circuit is connected to the generator winding via a half-wave rectifier.

13. A braking arrangement according to claim 1, wherein each said amplifier is connected to the generator winding via a voltage-stabilizing circuit.

14. A braking arrangement according to claim 13, wherein the reference voltage source is connected to the voltage-stabilizing circuit and comprises a further voltage-stabilizing circuit whose constant output voltage is lower than the constant voltage supplied by the first-mentioned voltage-stabilizing circuit.

15. A braking arrangement according to claim 1, wherein for supplying operating voltage to external power consumers a separate voltage-stabilizing circuit is connected to the generator winding.

* * * * *